(12) United States Patent
Takita

(10) Patent No.: US 7,760,994 B2
(45) Date of Patent: Jul. 20, 2010

(54) IMAGE CAPTURING APPARATUS WITH UNDERWATER IMAGE COMPENSATION AND UNDERWATER FLASH COMPENSATION

(75) Inventor: Mark Takita, Menlo Park, CA (US)

(73) Assignee: Nikon Corporation, Tokyo (JP)

(*) Notice: Subject to any disclaimer, the term of this patent is extended or adjusted under 35 U.S.C. 154(b) by 821 days.

(21) Appl. No.: 11/399,114

(22) Filed: Apr. 6, 2006

(65) Prior Publication Data
US 2007/0237505 A1 Oct. 11, 2007

(51) Int. Cl.
G03B 17/08 (2006.01)
H04N 7/18 (2006.01)

(52) U.S. Cl. .............................. 396/25; 396/28; 396/29; 348/81

(58) Field of Classification Search ............. 396/25–29; 348/81
See application file for complete search history.

(56) References Cited

U.S. PATENT DOCUMENTS

| | | | |
|---|---|---|---|
| 5,365,290 A | 11/1994 | Suzuki et al. | |
| 5,438,363 A | 8/1995 | Ejima et al. | |
| 5,512,941 A * | 4/1996 | Takahashi et al. | 348/81 |
| 2004/0041941 A1 | 3/2004 | Takeshita | |
| 2005/0195290 A1 | 9/2005 | Takeshita | |
| 2005/0264685 A1 | 12/2005 | Hoshuyama | |

FOREIGN PATENT DOCUMENTS

JP 2004-282460 10/2004

OTHER PUBLICATIONS

Olympus USA America, Olympus Stylus 770 SW Goes Where No Other Digital Point-And-Shoot Camera Has Gone Before, Jan. 25, 2007, p. 1-5, http://www.olympususamerica.com/cpg_section/cpg_PressDetails.asp?pressNo=524, CenterValley, PA, United States.

The Nikon Guide to Digital Photography with the D2x Digital Camera by Nikon Corporation. The D2x digital camera was released on Feb. 25, 2005.

(Continued)

*Primary Examiner*—Rochelle-Ann J Blackman
(74) *Attorney, Agent, or Firm*—Roeder & Broder LLP

(57) ABSTRACT

An image capturing apparatus (210) for capturing an image (214) of a scene (12) that is within a fluid (16) includes an apparatus frame (228), a capturing system (230), and a control system (236). The capturing system (230) captures the image (214). The control system (236) adjusts a color content of the captured image (214) based on at least one of a separation distance (SDist) between the image capturing apparatus (210) and a subject (20) of the scene (12); an apparatus depth (AD) of the image capturing apparatus (210) below a fluid surface (21); a subject depth (SDep) of the subject (20) below the fluid surface (21); or a fluid type of the fluid (16). Additionally, the image capturing apparatus (210) can include a depth sensor (234) that provides an apparatus depth signal that corresponds to the apparatus depth (AD) of the image capturing apparatus (210). Moreover, the image capturing apparatus (210) can include an illumination system (724) that generates a generated light beam (726) that can adjusted to compensate for the light that is attenuated by the fluid (16).

36 Claims, 9 Drawing Sheets

OTHER PUBLICATIONS

Proceedings of the 2004 IEEE Computer Society Conference on Computer Vision and Pattern Recognition (CVPR'04) 1063-6919/04.

Model No. GM 5WA06200Z by SHARP—Built-in 3-chip, Super-luminosity Chip LED, as of Apr. 2001.

http://optics.org/aticles/news/10/10/14/1 Dated Dec. 10, 2004, Lamina Ceramics LED array.

Luxeon Flash LXCL-PWF1—Technical Datasheet DS49. Dated Nov. 12, 2004, Lumileds Future Electronics.

* cited by examiner

US 7,760,994 B2

IMAGE CAPTURING APPARATUS WITH UNDERWATER IMAGE COMPENSATION AND UNDERWATER FLASH COMPENSATION

BACKGROUND

Cameras are commonly used to capture an image of a scene. Additionally, some cameras are waterproof or are positioned in an underwater casing. These cameras can be used to capture an image of a scene that is underwater.

It is well known that water attenuates longer wavelength light more then shorter wavelength light. As a result, underwater, at shallow depths, red structures in the scene no longer appear red. This effect continues for increasing depths, and longer wavelength (visible) colors. As a result thereof, typical underwater photographs are dominated by short wavelength colors, e.g. blue and the longer wavelength colors, e.g. red are absorbed proportionally to the depth underwater.

SUMMARY

The present invention is directed to an image capturing apparatus for capturing an image of a subject in a scene within a fluid. The image capturing apparatus includes an apparatus frame, a capturing system, and a depth sensor. The capturing system captures the image. The depth sensor provides an apparatus depth signal that corresponds to an apparatus depth of the image capturing apparatus below the fluid surface. In one embodiment, the image capturing apparatus also includes a control system that utilizes the apparatus depth signal to adjust a color composition of the image that is captured by the capturing system. With this design, in certain embodiment, the control system can adjust the color composition of the image to compensate for light that is attenuated by the fluid. Stated in another fashion, the control system can calculate an attenuation of wavelengths based on the apparatus depth signal and the control system can adjust the color composition of the image that is captured by the capturing system based on the attenuation and absorption of different wavelengths in the fluid.

In one embodiment, the depth sensor includes a pressure sensor that measures the pressure at the fluid surface and continuously as the image capturing apparatus is moved under the fluid. With the relative difference in pressure, the apparatus depth can be determined.

Additionally, the control system can use a separation distance between the image capturing apparatus and the subject of the scene, as calculated by using the focusing distance for example, to adjust a color composition of the image that is captured by the capturing system. In this embodiment, the control system can calculate an attenuation of light based on the apparatus depth and the separation distance and the control system can adjust the color composition of the image that is captured by the capturing system based on the attenuation of light.

Moreover, the control system can additionally utilize information regarding a fluid type of the fluid to adjust a color composition of the image that is captured by the capturing system.

In one embodiment, the image capturing apparatus includes a depth warning indicator that is electrically connected to the apparatus depth sensor. The depth warning indicator can indicate when the image capturing apparatus is at a predetermined warning depth under the fluid surface. For example, the predetermined warning depth can be approximately at or near the maximum allowable depth that the image capturing apparatus is waterproof. With this design, the depth warning indicator can notify the user when the image capturing apparatus is approaching or at the maximum allowable depth for the image capturing apparatus.

In another embodiment, the control system adjusts a color content of the captured image based on at least one of (i) a separation distance between the image capturing apparatus and the subject, (ii) an apparatus depth of the image capturing apparatus below the fluid surface, (iii) a subject depth of the subject below the fluid surface, or (iv) the fluid type of the fluid. With this design, for example, the control system can calculate an attenuation of light based on at least one of (i) the separation distance, (ii) the apparatus depth, (iii) the subject depth, or (iv) the fluid type.

Additionally, or alternatively, the image capturing apparatus can include a selector that can be selectively controlled by a user of the image capturing apparatus. In one embodiment, the selector can be selectively controlled by a user to select one or more of (i) the separation distance, (ii) the apparatus depth, (iii) the subject depth, or (iv) the fluid type.

In yet another embodiment, the image capturing apparatus also includes an illumination system that generates a generated light beam. In this embodiment, for example, the control system controls the wavelengths of the illumination system to adjust a color composition of the generated light beam based on at least one of (i) the separation distance, (ii) the apparatus depth, (iii) the subject depth, or (iv) the fluid type. With this design, in certain embodiments, the image capturing apparatus can more accurately capture the true colors of the underwater scene.

As utilized herein, the actual or true colors of the underwater scene shall mean colors that are present with no light attenuation at the scene and even white light illumination of the scene.

The present invention is also directed to a method for capturing an image of a subject that is within a fluid.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which.

DESCRIPTION

Figure 1A:
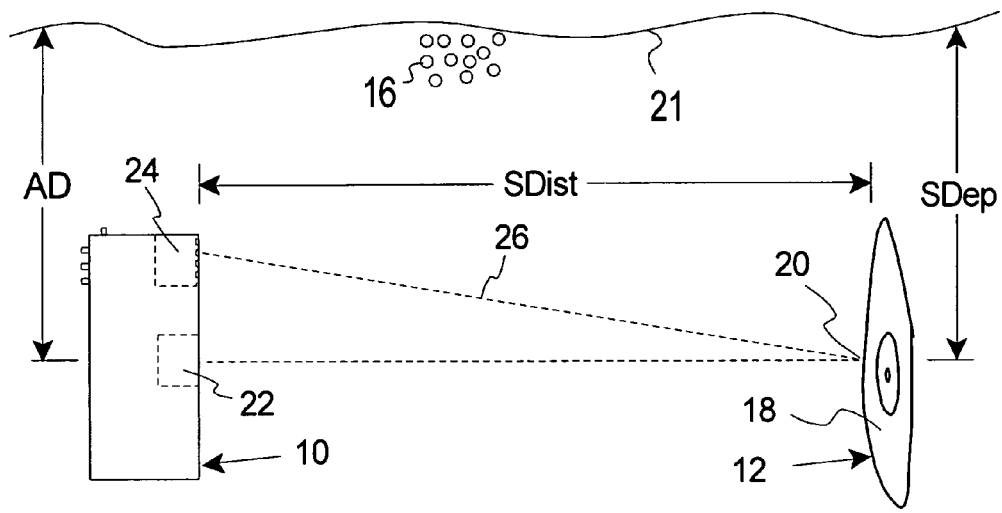
FIG. 1A is a simplified side plan illustration of a scene and an image capturing apparatus having features of the present invention.

FIG. 1A is a simplified side plan illustration of an image capturing apparatus 10 having features of the present invention and a scene 12. The image capturing apparatus 10 is useful for capturing an image 214 (illustrated in FIG. 2B) of the scene 12. The type of scene 12 captured by the image capturing apparatus 10 can vary. In certain embodiments, the image capturing apparatus 10 is waterproof and is adapted to capture images of one or more scenes 12 that are partly or fully under a fluid 16 (partly illustrated as a plurality of small circles), e.g. water. For example, each scene 12 can include one or more underwater animals, plants, mammals, fish, coral, objects, and/or environments. In FIG. 1, the scene 12 includes a starfish 18 that is a subject 20, e.g. the focal point of the scene 12.

In certain embodiments, the image capturing apparatus 10 can be any device capable of capturing the image 214, including (i) a digital camera that electronically stores the image 214, (ii) a digital camera in video mode, (iii) a conventional film type camera that records the scene 12 on a photosensitive film or plate, and/or (iv) a video recording device that electronically records still or moving images 214. As provided herein, in certain embodiments, the image capturing apparatus 10 includes one or more features that compensate for the attenuation absorption of light in water 16 and/or that allow the image capturing apparatus 10 to more accurately capture the true colors of the underwater scene 12.

In FIG. 1A, the focal point 20 of the scene 12, e.g. the center of the starfish 18 is at a subject depth SDep below a fluid surface 21, and an optical assembly 22 (illustrated in phantom) of the image capturing apparatus 10 is at an apparatus depth AD below the fluid surface 21. For example, the subject depth SDep can be greater than, less than or approximately equal to the apparatus depth AD. The apparatus depth AD at which the image capturing apparatus 10 is still waterproof can vary according to the design of the image capturing apparatus 10. For example, in non-exclusive alternative embodiments, the image capturing apparatus 10 can be waterproof up to an apparatus depth AD of at least approximately 3, 5, 10, 30, 40, 50, or 100 meters.

Moreover, the subject 20 of the scene 12 is separated a separation distance SDist away from optical assembly 22 of the image capturing apparatus 10. The acceptable amount of separation distance SDist can be varied according to the type of optical assembly 22 utilized in the image capturing apparatus 10, the visibility of the water 16, and other factors including, but not limited to, the amount of available light, film or digital sensor sensitivity. In one, non-exclusive embodiment, the separation distance SDist can be between approximately 1 millimeter and 30 meters.

In one embodiment, the image capturing apparatus 10 includes an illumination system 24 (illustrated in phantom) that is controlled to generate a generated light beam 26 (illustrated with a dashed line) at approximately the same time as the image 214 is created. In one embodiment, the generated light beam 26 is directed towards the scene 12 and the image capturing apparatus 10 captures the light from the scene 12. The illumination system 24 is discussed in more detail below.

Figure 1B:
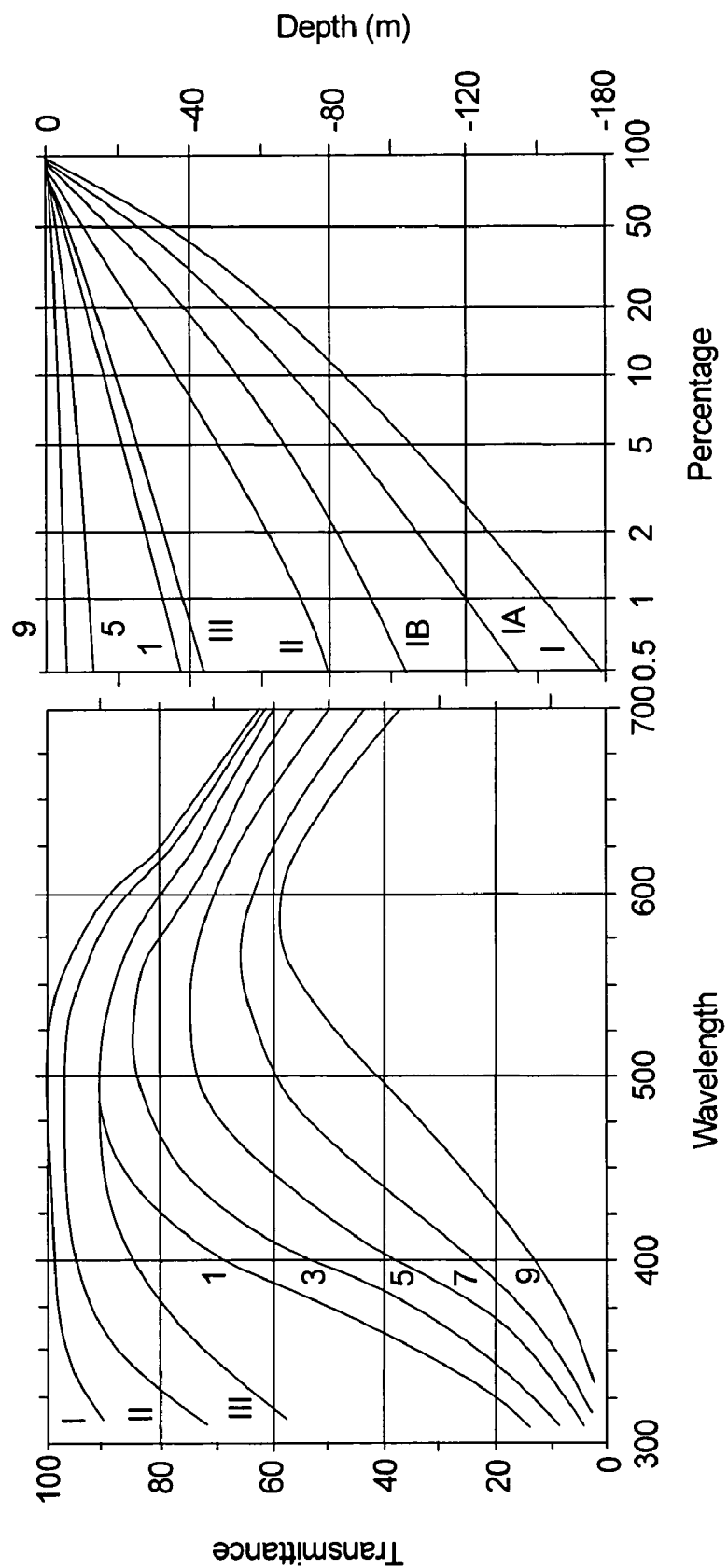
FIG. 1B includes a graph that illustrates the attenuation of light as a function of wavelength and a graph that illustrates the percentage of light reaching certain depths.

FIG. 1B includes a first graph that illustrates the attenuation of light in a fluid (the ocean) in percent per meter as a function of wavelength and a second graph that illustrates the percentage of 465 nm light reaching certain depths. In these graphs, line I represents extremely pure ocean water; line II represents turbid tropical-subtropical water; line III represents mid-latitude water; and lines 1-9 represent coastal waters of increasing turbidity. The incidence angle is 90 degrees for lines I-III and the incidence angle is 45 degrees for lines 1-9. The graphs in FIG. 1B are reproduced from "Marine Optics" by Nils Gunner Jerlov (© 1976), ISBN 0444414908.

As can be seen in FIG. 1B, attenuation of light is influenced by type of fluid and depth. Further, the attenuation of light is also influenced by the wavelength of the light. For example, longer wavelength light is attenuated more rapidly then shorter wavelength light.

Figure 2A:
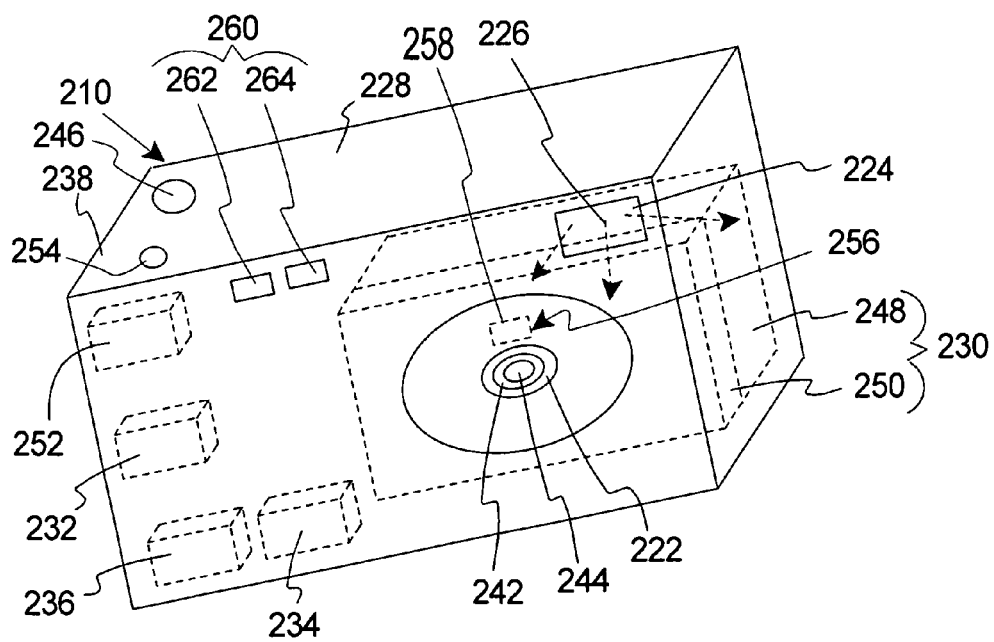
FIG. 2A is a simplified front perspective view of one embodiment of the image capturing apparatus.

FIG. 2A illustrates a simplified, front perspective view of one, non-exclusive embodiment of the image capturing apparatus 210. In this embodiment, the image capturing apparatus 210 is a camera that includes an apparatus frame 228, an optical assembly 222, a capturing system 230 (illustrated as a box in phantom), a power source 232 (illustrated as a box in phantom), an illumination system 224, an apparatus depth sensor 234 (illustrated as a box in phantom), and a control system 236 (illustrated as a box in phantom). The design of these components can be varied to suit the design requirements and type of image capturing apparatus 210. Further, the image capturing apparatus 210 could be designed without one or more of these components. For example, the image capturing apparatus 210 could be designed without the apparatus depth sensor 234 and/or the illumination system 224.

The apparatus frame 228 can be rigid and support at least some of the other components of the image capturing apparatus 10. In one embodiment, the apparatus frame 228 includes a generally rectangular shaped hollow body 238 that forms a cavity that receives and retains at least a portion of the capturing system 230.

Figure 3:
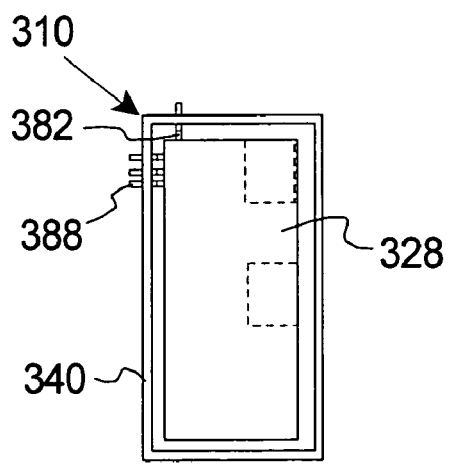
FIG. 3 is a simplified side plan illustration of another embodiment of an image capturing apparatus having features of the present invention.

In one embodiment, apparatus frame 228 is watertight and forms a watertight compartment that protects the electronic components of the image capturing apparatus 210. Alternatively, as illustrated in FIG. 3 and described below, the image capturing apparatus 310 can include an outer housing 340 that forms an outer shell that surrounds and encloses the apparatus frame 328 and that provides a watertight barrier around the electronic components of the image capturing apparatus 310.

Referring back to FIG. 2A, the apparatus frame 228 can include an aperture 242 and a shutter mechanism 244 that work together to control the amount of light that reaches the capturing system 230. For example, the aperture 242 is a substantially circular opening in the front of the body 238 that helps to control the amount of light that reaches the capturing system 230. The beams of light from the object(s) of the scene 12 (illustrated in FIG. 1A) can be directed into the body 238 through the aperture 242. To increase the amount of light that ultimately gets focused on the capturing system 230 the size of the aperture 242 can be increased. Conversely, to decrease the amount of light that gets focused on the capturing system 230 the size of the aperture 242 can be decreased.

The shutter mechanism 244 can include a pair of shutter shades, e.g. blades, positioned between the optical assembly 222 and the capturing system 230 and a shutter button 246 that activates the shutter blades. The shutter blades work in conjunction with each other to allow the light to be focused on the capturing system 230 for a certain amount of time. Before capturing the image 214, the first shutter blade is closed so no light will be focused on the capturing system 230. When the shutter button 246 is pressed, the first shutter blade slides open to allow light to be focused on the capturing system 230. After a certain preset amount of time, the second shutter blade slides closed so as to prevent further light from being focused on the capturing system 230.

The amount of time that the shutter mechanism 244 permits the light to pass through the aperture 242 is commonly referred to as the shutter speed. A slow shutter speed means that the shutter mechanism 244 is open for a relatively long period of time, thereby allowing a greater amount of light to be captured and ultimately focused on the capturing system 230. Slow shutter speeds are commonly used when the amount of light available outside the body 238 of the camera is relatively low. Conversely, a fast shutter speed means that the shutter mechanism 244 is open for a relatively short period of time, thereby allowing less light to be captured and ultimately focused on the capturing system 230. Fast shutter speeds are commonly used to minimize the effect of movement of the object(s) in the scene 12 or to limit the amount of light.

The optical assembly 222 is secured to the body 238 near the aperture 242. The optical assembly 222 can include a single lens or a combination of lenses that work in conjunction with each other to focus light onto the capturing system 230. The optical assembly 222 focuses the light that passes through the aperture 242 onto the capturing system 230.

The distance between the optical assembly 222 and the capturing system 230, commonly referred to as the focal length, can be adjusted to control how much light is ultimately focused on the capturing system 230. As the focal length decreases, the corresponding image 214 that is created at the capturing system 230 gets smaller. Conversely, as the focal length increases, the magnification of the image 214 also increases and the object(s) being captured appear to get closer.

The capturing system 230 captures the image 214, is positioned within the apparatus frame 228, and is coupled to the apparatus frame 228. The design of the capturing system 230 can vary according to the type of image capturing apparatus 10. For example, for a conventional film type camera, the capturing system 230 includes a piece of film. In this design, light focused on the film causes a chemical reaction which results in the image 214 being formed on the film. Alternatively, as illustrated in FIG. 2A, for a digital type camera, the capturing system 230 includes an image sensor 248 (illustrated in phantom), a filter assembly 250 (illustrated in phantom), and a storage system 252 (illustrated in phantom).

The image sensor 248 receives the light that passes through the aperture 242 and converts the light into electricity. The type of image sensor 248 can vary. One non-exclusive example of an image sensor 248 for digital cameras is known as a charge coupled device ("CCD"). A CCD consists of an integrated circuit containing an array of tiny, light-sensitive photosites or pixels, which are capable of accumulating varying amounts of charge in proportion to the amount of light they receive. A CCD can contain thousands or even millions of these photosites, each of which is individually light-sensitive.

When the beams of light strike the surface of the CCD, it frees up electrons to move around, and the CCD reads the accumulated charge that is produced at each photosite. The CCD, because the accumulated charge at each photosite is read in analog form, further employs the use of an analog-to-digital converter, or ADC, which converts the value of the accumulated charge at each photosite into a digital value. The overall effect of the operation of the CCD and ADC is the formation of a digital grayscale image that corresponds to how much light has fallen on each photosite. The amount of detail that is captured within such an image formed through use of a CCD is referred to as resolution, and resolution is measured by the number and quality of photosites or pixels on the surface of the CCD. By way of example, a CCD which contains an array of one million photosites is referred to as having 1.0 megapixels.

An alternative image sensor 248 that may be employed in digital cameras uses complementary metal oxide semiconductor ("CMOS") technology. CMOS devices use several transistors at each photosite to amplify and move the charge using more traditional wires.

As noted above, the image sensor 248, by itself, produces a grayscale image as it only keeps track of the total intensity of the light that strikes the surface of the image sensor 248. Accordingly, in order to produce a full color image, the filter assembly 250 is necessary to recreate the image 214 with its true colors. The filter assembly 250 is able to recreate the true colors of the image 214 by focusing on and capturing the three primary colors, red, blue and green.

The filter assembly 250 can be positioned directly in front of the image sensor 248. While there are several methods for capturing the three primary colors in a digital camera, the most common filter assembly 250 used in digital cameras is a bayer filter or bayer mask. A bayer filter has an essentially checkerboard pattern that alternates between rows of red and green filters with rows of blue and green filters. By placing the bayer filter directly in front of the image sensor 248, each square of four pixels has one filtered red, one filtered blue, and two filtered green (as the human eye is more sensitive to green than either red or blue). The unconverted output from the image sensor 248 employing a bayer filter is a mosaic of green, red and blue photosites of different intensities. The camera then uses specialized algorithms to convert this mosaic into a mosaic that exhibits the true colors as captured from the object(s) being photographed.

It should be noted that other designs for the capturing system 230 can be utilized.

It should also be noted, as discussed in more detail below, that with information from the capturing system 230, the control system 236 can compensate for the absorption of light in the fluid 16.

The storage system 252 stores the various images 214 before the images 214 are ultimately printed out, deleted, transferred or downloaded to another system (not shown), such as a computer, an auxiliary storage system or a printer. The storage system 252 can be fixedly or removable coupled to the apparatus frame 228. Non-exclusive examples of suitable storage systems 252 include flash memory, a floppy disk, a hard disk, or a writeable CD or DVD. Further, the amount of storage space within the storage system 252 can vary greatly depending upon the specific storage system 252 chosen.

The power source 232 provides electrical power to the electrical components of the image capturing apparatus 210. For example, the power source 232 can include one or more chemical batteries, either the one time use disposable batteries (such as alkaline, zinc-air), or the multiple use rechargeable batteries (such as nickel-cadmium, nickel-metal-hydride, lead-acid, lithium-ion).

Often times images 214 are taken in an environment where sufficient natural or artificial light is present so as to enable the production of a high quality and easily discernible image. However, other times images 214 are taken in an environment which provides limited amounts of lighting where the illumination system 224 may be required. If needed, the illumination system 224 can provide the generated light beam 226 (e.g. a flash of light) that can be used to illuminate at least a portion of the scene 12.

The design of the illumination system 224 can vary according to the teachings provided herein. In one embodiment, the illumination system 224 emits a consistent, white generated light beam 226 that illuminates the scene 12. Alternatively, as described in more detail below, the illumination system 224 can generate a generated light beam 226 having a color content that compensates for the attenuation and absorption of the light by the fluid 16.

The illumination system 224 can be coupled to the apparatus frame 228. For example, the illumination system 224 can be fixedly mounted to the apparatus frame 228, positioned at least partly within the apparatus frame 228, removably affixed to the apparatus frame 228 and/or usable spaced apart from the apparatus frame 228.

If needed, the control system 236 activates the illumination system 224 at the appropriate time so that the desired image 214 is captured. For example, the control system 236 can direct power to the illumination system 224, to produce the generated light beam 226 substantially simultaneously as the image 214 is being captured.

The apparatus depth sensor 234 measures the depth of a portion of the image capturing apparatus 210 under the fluid surface 21 (illustrated in FIG. 1A). For example, the depth sensor 234 can measure the depth of the image capturing apparatus 210 prior to, during and/or immediately after the image 214 is captured with the capturing system 230. Further, the depth sensor 234 can provide an apparatus depth signal that is transferred to the control system 236 so that the control system 236 can precisely compensate for the absorption of light in the fluid 16 and/or precisely control the operation of the illumination system 224. For example, the apparatus depth sensor 234 can be a pressure sensor that measures the pressure near the image capturing apparatus 210. Alternatively, the apparatus depth sensor 234 can be another type of sensor.

Moreover, the apparatus depth signal from the apparatus depth sensor 234 can be used to display the current depth of the image capturing apparatus 10. Alternatively, or additionally, the apparatus depth signal from the apparatus depth sensor 234 via the control system 236 can be provided to a depth warning indicator 254 that notifies the user when the image capturing apparatus 10 is at a predetermined warning depth under the fluid surface 21. For example, the predetermined warning depth can be approximately at or near the maximum allowable depth that the image capturing apparatus 210 is waterproof. In non-exclusive embodiments, the depth warning indicator 254 can be activated when the image capturing apparatus 10 is within approximately 5, 4, 3, 2, 1, or 0 meters from the maximum allowable water depth for the image capturing apparatus 210. With this design, the depth warning indicator 254 can notify the user when the image capturing apparatus 210 is approaching or at the maximum allowable depth for the image capturing apparatus 210. Alternatively, the predetermined warning depth can be entered by the user as an indication when the user is approaching the desired maximum diving depth.

As non-exclusive examples, the depth warning indicator 254 can include an audio alarm (e.g. a buzzer), a visual alarm (e.g. a flashing light), or a vibrator.

Alternatively, as described in more detail below, the approximate depth or anticipated depth in which the image 214 is captured can be manually input by the user as discussed below.

In one embodiment, the imaging capturing apparatus 210 includes an autofocus assembly 256 including one or more lens movers 258 that move one or more lenses of the optical assembly 222 in or out until the sharpest possible image of the subject 20 is received by the capturing system 230. For example, the autofocus assembly 256 can be an active or passive type system.

An active autofocus assembly 256 includes a distance measuring system 260 that determines the distance between the optical assembly 222 and the subject 20 of the scene 12. For example, the distance measuring system 260 can include a signal generator 262 and a signal receiver 264. In one embodiment, the signal generator 262 generates a signal, such as a sound wave that is reflected off of the subject 20 back to the signal receiver 264. With information from the signal receiver 264, the control system 236 calculates the distance between the optical assembly 222 and the subject 20. Using the distance, the control system 236 controls the lens mover 258 to adjust the optical assembly 222. Alternatively, for example, the signal generator 262 can generate an infrared light beam.

A passive autofocus assembly 256 determines the distance between the optical assembly 222 and the subject 20 using the control system 236 to analyze the image itself. More specifically, the control system 236 looks at the scene 12 and drives the lens back and forth with the lens mover 258 searching for the best focus.

One type of passive autofocus sensor includes a charge-coupled device that provides input to algorithms that compute the contrast of the elements of the image. The CCD can be a single strip of 100 to 200 pixels. Light from the scene 12 hits the strip and the control system 236 looks at the value at each pixel. More specifically, the control system 236 looks for the difference in intensity among the adjacent pixels. If the scene 12 is out of focus, the adjacent pixels have somewhat similar intensities. The control system 236 controls the lens mover 258 to move the lens, looks at the pixels again and determines if the difference in intensity between adjacent pixels has gotten worse or improved. The lens is moved until there is a maximum intensity difference between adjacent pixels.

With either system, the focusing process continues while user presses the shutter release button half-way down. Further, with each system, the control system 236 can determine the distance between the optical assembly 222 and the subject 20. Thus, the autofocus assembly 256 is able to determine the separation distance SDist (illustrated in FIG. 1A) between the image capturing apparatus 210 and the subject 20. Further, the autofocus assembly, 256 is able to provide a separation distance signal to the control system 236 that relates to the separation distance SDist.

Alternately or additionally, the image capturing apparatus 210 can include a separate sensor (not shown) that determines the separation distance SDist between the image capturing apparatus 210 and the subject 20 of the scene 12. Still alternatively, as described in more detail below the approximate separation distance SDist can be manually input in the image capturing apparatus 210 by the user.

The control system 236 is electrically connected to and controls the operation of the electrical components of the image capturing apparatus 210. For example, the control system 236 is electrically connected to autofocus assembly 256, the apparatus depth sensor 234, and the illumination system 224 and controls the operation of the autofocus assembly 256, the apparatus depth sensor 234, and the illumination system 224 to precisely control these components. The control system 236 can include one or more processors and circuits and the control system 236 can be programmed to perform one or more of the functions described herein.

In certain embodiments, the control system 236 adjusts a color content of the captured image 214 based one or more of the following factors (i) the separation distance SDist, (ii) the apparatus depth AD, (iii) the subject depth SDep, and (iv) a fluid type of the fluid 16. For example, the control system 236 can adjust the color content of the captured image 214 based on any one or any combination of the factors described herein. Further, one or more of the factors can be manually input by the user into the control system 236 and/or measured by the image capturing apparatus 210.

In one embodiment, control system 236 evaluates the color content that is present in an originally captured initial image (not shown in FIG. 2A) that is captured by the capturing system 230 from the scene 12. The control system 236 can subsequently replace the colors that were attenuated and generate the image 214 which more accurately represents the actual color composition of the scene 12.

For example, if the control system 236 determines that the subject 20 contains a red region, the control system 236 can calculate an approximate attenuation of the red light on the subject 20 based on one or more of (i) the separation distance SDist, (ii) the apparatus depth AD, (iii) the subject depth SDep, or (iv) the fluid type. The amount of attenuation and/or absorption of light can be calculated with the control system 236 using information from graphs that are somewhat similar to the graphs illustrated in FIG. 1B or other sources. With information regarding the attenuation, the control system 236 can provide reverse attenuation of the red, e.g intensify red from the initial image so that the displayed image 214 more accurately represents the actual colors of the scene 12.

The control system 236 can perform a similar function for each of the other colors in the subject 20 and the rest of the scene 12. Thus, the control system 236 adjusts the image 214 by adjusting the intensity of the red, green and blue color values in the image 214. Blue is significantly attenuated, green has medium attenuation and red has high amplification. As a result thereof, in one embodiment, the control system 236 can adjust the color compensation of the image 214 by intensifying the red more than the green or the blue. With this design, the control system 236 can provide reverse compensation and replace the colors of the scene 12 that are lost due to attenuation.

In one embodiment, the control system 236 utilizes information regarding the separation distance SDist (from the autofocus assembly 256, the separate sensor, or manual input) and the apparatus depth AD (from the depth sensor 234, or manual input) to estimate and calculate the attenuation of the light (red, green, and blue colors). Further, the control system 236 evaluates the colors of the originally captured image and compensates for the absorption of light (lost colors) in the fluid 16 so that the displayed image 214 more accurately represents the true colors of the scene 12 within the fluid 16. For example, the control system 236 can continuously adjust the underwater color balance of the captured image based on depth and focal length information. Thus, the control system 236 can compensate for the longer red, orange, yellow, and green wavelengths of light are absorbed. Stated in another fashion, the control system 236 can then provide amplification of these colors, and re-compensate the digital picture to restore the actual colors more accurately.

In one embodiment, the control system 236 is coupled to the apparatus frame 228 and is positioned within the apparatus frame 228.

Figure 2B:
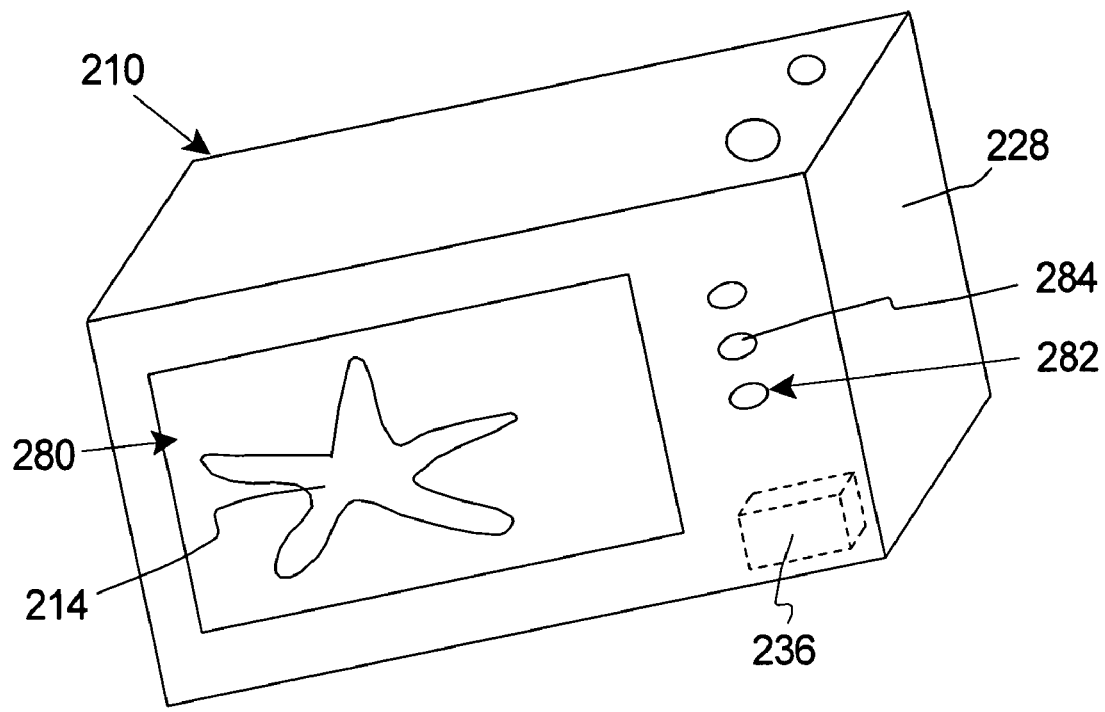
FIG. 2B is a simplified rear perspective view of the image capturing apparatus of FIG. 2A.

Referring to FIG. 2B, additionally, the image capturing apparatus 210 can include an image display 280 that displays the image 214 that is being captured and optionally adjusted by the control system 236. With this design, the user can decide which images 214 should be stored in the storage system 252 and which images 214 should be deleted. Further, as a result thereof, divers and snorkelers can share the adjusted images 214 upon completion of the diving or snorkeling experience.

In one embodiment, the image display 280 can be fixedly mounted to the apparatus frame 228 on the back side. Alternatively, the image display 280 can be secured to the apparatus frame 228 with a hinge mounting system (not shown) that enables the display to be pivoted away from the apparatus frame 228. One non-exclusive example of an image display includes an LCD screen.

Moreover, the image capturing apparatus 210 can include one or more control switches 282 electrically connected to the control system 236 that allows the user to control the functions of the image capturing apparatus 210. For example, the control switches 282 can be used to turn on and off the apparatus 210, delete images 214, focus the image 214, and many other functions.

Additionally, one or more of the control switches 262 can be a selector 284 that can be used to manually input one or more of (i) the separation distance, (ii) the apparatus depth, (iii) the subject depth, and (iv) the fluid type.

Moreover, one or more of the control switches 262 can be used to switch the image capturing apparatus 210 to an under fluid mode in which one or more of the image compensation features disclosed herein are activated.

FIG. 3 is a simplified side plan illustration of another embodiment of an image capturing apparatus 310 that is somewhat similar to the corresponding image capturing apparatus 210 described above. However, in this embodiment, the apparatus frame 328 is not waterproof. Instead, in this embodiment, the image capturing apparatus 310 includes a selectively removable outer housing 340 that forms an outer shell that surrounds and encloses the apparatus frame 328 and that provides a watertight barrier around the electronic components of the image capturing apparatus 310.

In one embodiment, the outer housing 340 is at least partly made of a clear material. Moreover, the outer housing 340 can include one or more pass through switches 388 that can be used to control the operation of the control switches 382 of the image capturing apparatus 310. For example, each pass through switch 388 can be a button that is aligned with and engages one of the control switches 382. Further, each button extends through the outer housing 340 and is movable sealed to the outer housing 340. With this design, the user can control the control switches 382 when the outer housing 340 encircles the rest of the image capturing apparatus 310.

In one embodiment, the apparatus depth sensor 234 can be secured to the outer housing 340 and the outer housing 340 can be referred to as part of the apparatus frame.

Figure 4A:
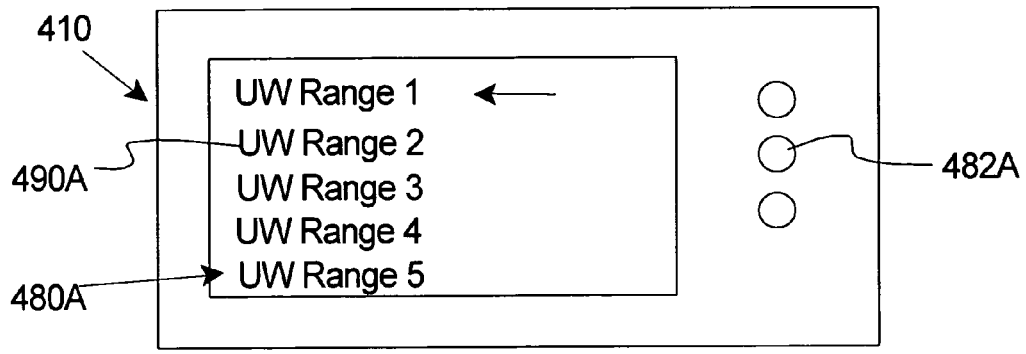
FIGS. 4A-4D are rear views of alternative embodiments of the image capturing apparatus.

FIG. 4A is a simplified rear plan illustration of another embodiment of an image capturing apparatus 410A that is similar to the corresponding apparatus described above. However, in this embodiment, the image capturing apparatus 410A does not include a depth sensor. In this embodiment, the user can manually input the approximate apparatus depth AD at which the image capturing apparatus 410A will be utilized or the approximate apparatus depth AD at which the image capturing apparatus 410A is now located. Alternatively, even if the image capturing apparatus 410A does include a depth sensor, the user could opt to operate the image capturing apparatus 410A in a manual mode in which the apparatus depth AD is manually input into the image capturing apparatus 410A.

In one embodiment, in the manual mode, the image display 480A could display a limited number of different apparatus depth ranges that are commonly experienced during snorkeling and/or scuba diving. For example, in FIG. 4A, the image display 480A list four different apparatus depth ranges 490A, namely (i) underwater range 1—used for snorkeling (average compensation 20 feet); (ii) underwater range 2—shallow SCUBA (average compensation 50 Feet); (iii) underwater range 3—medium depth SCUBA (average compensation 70 Feet); and (iv) underwater range 4—Deep depth SCUBA (average compensation 100 Feet). It should be noted that greater than four or less than four underwater ranges could be utilized and/or that one or more of the underwater ranges could have different depths.

With this design, the user can use one or more of the control switches 482A to move a cursor to select one of the potential underwater depth ranges 490A that they will likely experience during the snorkel or dive. The selection can be made prior or during the snorkel or dive.

After the manual selection of the underwater range 490A, the control system 236 (illustrated in FIG. 2A) can adjust the color content of the captured image to compensate for the attenuated colors as described above.

Figure 4B:
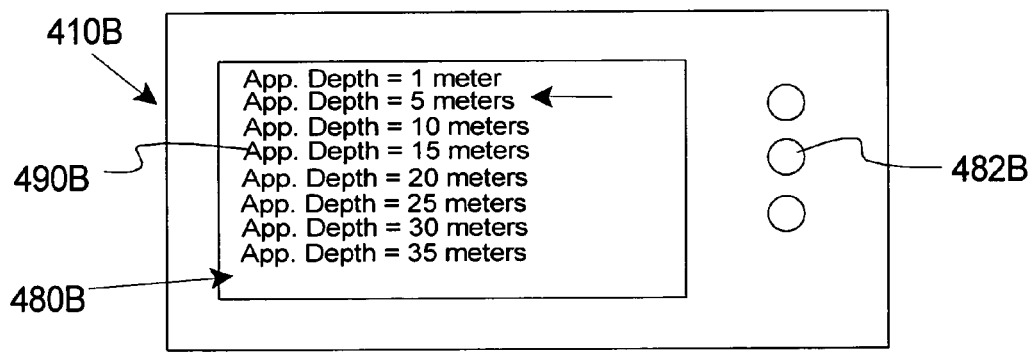

FIG. 4B is a simplified rear plan illustration of another embodiment of an image capturing apparatus 410B that is similar to the corresponding apparatus described above in FIG. 4A. In this embodiment, the user can again manually input the approximate apparatus depth AD at which the image capturing apparatus 410B will be utilized or the approximate apparatus depth AD at which the image capturing apparatus 410B is now located. Alternatively, even if the image capturing apparatus 410B does include the depth sensor, the user could opt to operate the image capturing apparatus 410B in a manual mode in which the apparatus depth AD is manually input into the image capturing apparatus 410B.

In one embodiment, in the manual mode, the image display 480B could display a limited number of different apparatus depths AD. For example, in FIG. 4B, the image display 480B displays eight different apparatus depths AD 490B, namely 1, 5, 10, 15, 20, 25, 30, and 35 meters. It should be noted that greater than eight or less than eight apparatus depths AD could be utilized and/or that other apparatus depths AD could be utilized.

With this design, the user can use one or more of the control switches 482B to move a cursor to select one of the apparatus depths AD prior to or during the snorkel or dive.

After the manual selection of the apparatus depth AD 490B, the control system 236 (illustrated in FIG. 2A) can adjust the color content of the captured image to compensate for the attenuated colors as described above.

Figure 4C:
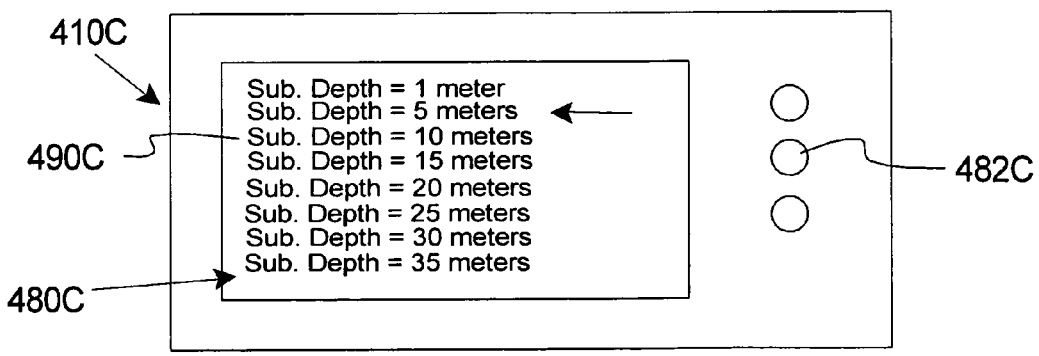

FIG. 4C is a simplified rear plan illustration of another embodiment of an image capturing apparatus 410C that is similar to the corresponding apparatus described above in FIG. 4A. In this embodiment, the user can manually input an approximate subject depth SDep of the subject 20 (illustrated in FIG. 1A) into the image capturing apparatus 410C.

In one embodiment, in the manual mode, the image display 480C could display a limited number of different subject depths SDep. For example, in FIG. 4C, the image display 480C displays eight different subject depths SDep 490C, namely 1, 5, 10, 15, 20, 25, 30, and 35 meters. It should be noted that greater than eight or less than eight subject depths SDep could be utilized and/or that other subject depths SDep could be utilized.

With this design, the user can use one or more of the control switches 482C to move a cursor to select one of the subject depths SDep prior to or during the snorkel or dive.

After the manual selection of the subject depth SDep 490C, the control system 236 (illustrated in FIG. 2A) can adjust the color content of the captured image to compensate for the attenuated colors as described above.

Figure 4D:
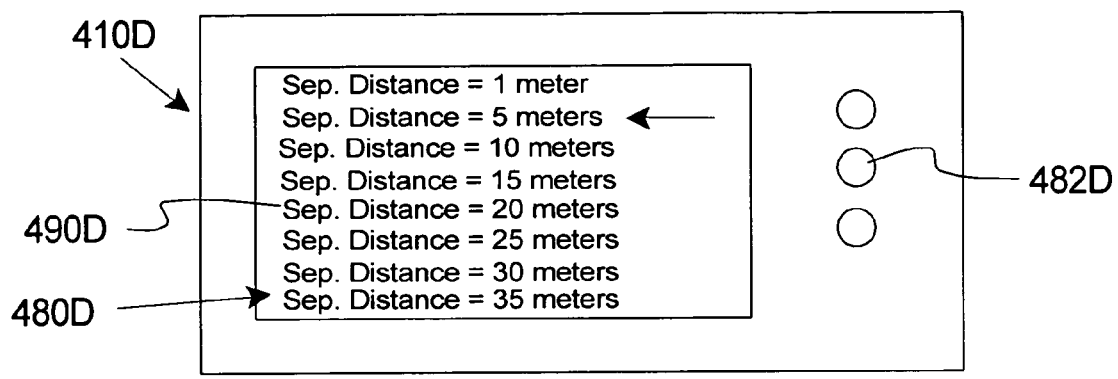

FIG. 4D is a simplified rear plan illustration of another embodiment of an image capturing apparatus 410D that is similar to the corresponding apparatus described above in FIG. 2A. In this embodiment, the user can manually input the approximate separation distance SDist that the image capturing apparatus 410D is positioned away from the subject 20 (illustrated in FIG. 1A) of the scene 12 (illustrated in FIG. 1A. Alternatively, even if the image capturing apparatus 410D does include a sensor that estimates the separation distance SDist, the user could opt to operate the image capturing apparatus 410 in an underwater manual mode in which the separation depth SDist is manually input into the image capturing apparatus 410D by the user.

In one embodiment, in the manual mode, the image display 480D could display a limited number of different separation distances SDist 490D. For example, in FIG. 4D, the image display 480D lists eight different separation distances SDist 490D, namely 1, 5, 10, 15, 20, 25, 30, and 35 meters. It should be noted that greater than eight or less than eight separation distances SDist could be utilized and/or that other separation distances SDist could be utilized.

With this design, the user can use one or more of the control switches 482D to move a cursor to select one of the separation distances SDist prior to or during the snorkel or dive.

After the manual selection of the separation distance SDist, the control system 236 (illustrated in FIG. 2A) can adjust the color content of the captured image to compensate for the attenuated light.

Figure 5A:
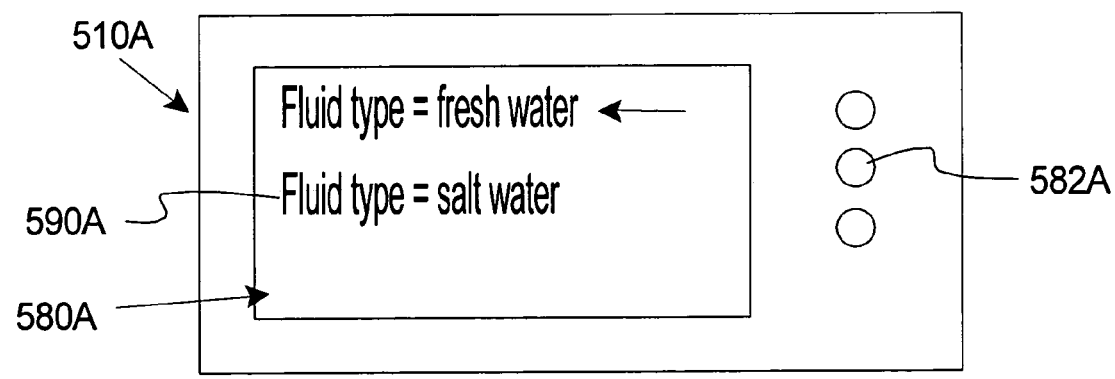
FIGS. 5A and 5B are rear views of more alternative embodiments of the image capturing apparatus.

FIG. 5A is a simplified rear plan illustration of another embodiment of an image capturing apparatus 510A that is similar to the corresponding apparatus described above in FIG. 2A. In this embodiment, the user can manually input a fluid type that the image capturing apparatus 510A will be utilized within. In one embodiment, in the manual mode, the image display 580A could display a limited number of different liquid types. For example, in FIG. 5A, the image display 580A displays the choice of two liquids, namely fresh water and salt water. With this design, the user can use one or more of the control switches 582A to move a cursor to select one of the fluid types 590A. Alternatively, other fluid type choices could be available. For example, the fluid types described in FIG. 1B could be listed as choices.

After the manual selection of the fluid type 590A, the control system 236 (illustrated in FIG. 2A) can adjust the color content of the captured image to compensate for the lost colors. The control system 236 can use the type of fluid, in addition to or alternatively to the apparatus depth AD and/or the separation distance SDist to further compensate for the attenuated light.

Figure 5B:
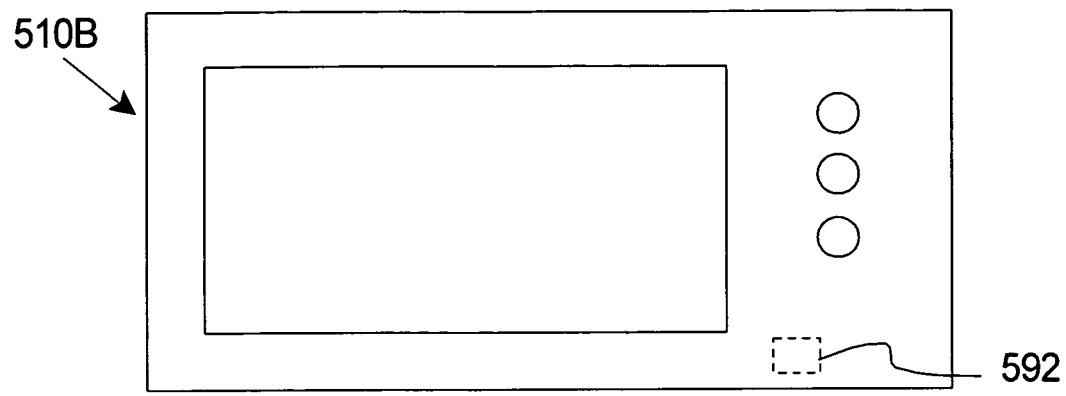

FIG. 5B is a simplified rear plan illustration of another embodiment of an image capturing apparatus 510B that is somewhat similar to the corresponding apparatus described above in FIG. 5A. However, in this embodiment, the image capturing apparatus 510B includes a fluid type sensor 592 (illustrated in phantom) that determines the type of fluid in which the image capturing apparatus 510B is subjected to. For example, the fluid type sensor 592 can be a conductivity sensor that evaluates if the apparatus 510B is positioned in fresh water or salt water.

After the information from the fluid type sensor 592 is transferred to the control system 236 (illustrated in FIG. 2A), the control system 236 can adjust the color content of the captured image to compensate for the attenuated light.

Figure 6:
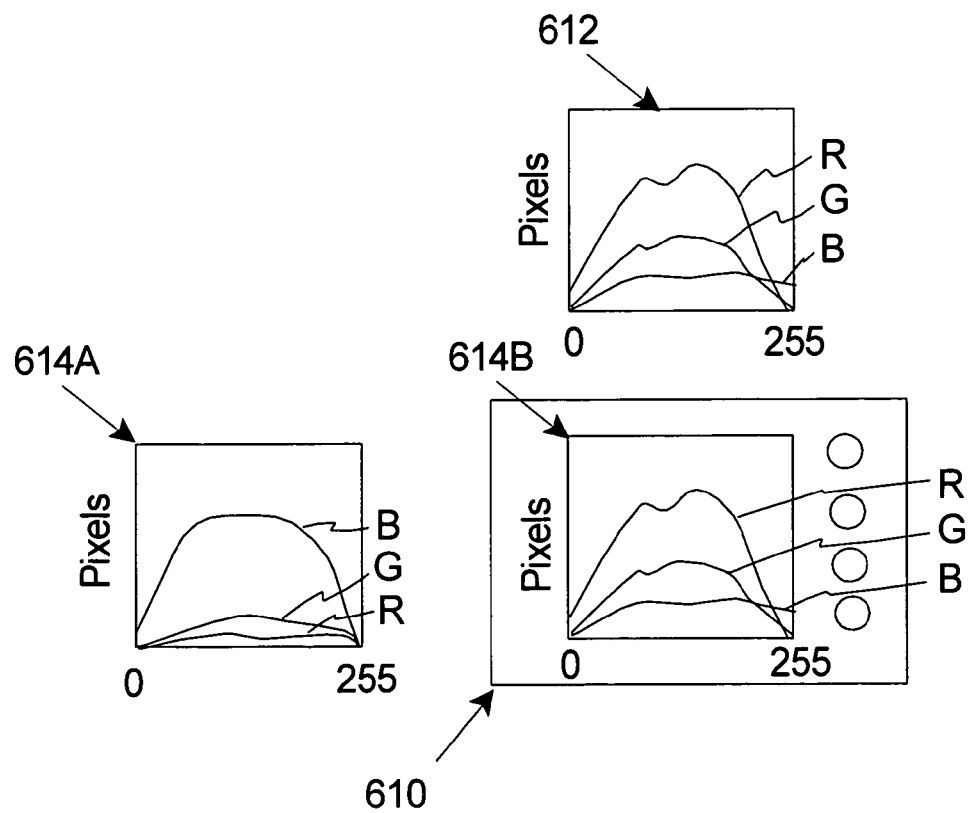
FIG. 6 is a simplified illustration of a RGB histogram of a scene, a RGB histogram of an unadjusted captured image of the scene, and a RGB histogram of an adjusted captured image of the scene.

FIG. 6 is a simplified illustration of a RGB histogram 612 of a scene within a fluid (not shown), a simplified view of a RGB histogram 614A of an unadjusted, originally captured image of the scene, and a simplified view of an image capturing apparatus 610 that displays a RGB histogram 614B of an adjusted captured image of the scene. In the RGB histograms 612, 614A, 614B, line designated "R" represents red, line designated "G" represents green, line designated "B" represents blue, and the level of R, G, and B is expressed as a number between 0 and 255. The vertical axis is relative number of pixels that have each value of R, G, B. For example, the higher the position of the curve, the higher number of pixels that have that particular value of R, G, B.

FIG. 6 illustrates that the RGB histogram 614A of the unadjusted captured image that is originally captured by the image capturing apparatus 610 without any color compensation by the image capturing apparatus 610 is very different from the RGB histogram 612 of the original scene. More specifically, some of the red R and green G from the scene has been lost. This difference is caused by the attenuation of light in the fluid. As a result thereof, the originally captured image does not accurately represent the true colors of the scene.

The RGB histogram 614B of the adjusted captured image is the color profile of the adjusted capture image that is adjusted by the image capturing apparatus 610 with the color compensation as described above. As is illustrated in FIG. 6, the image capturing apparatus 610 has compensated for the attenuation of light. As a result thereof, the RGB histogram 614B of the adjusted captured image closely resembles the RGB histogram 612 of the scene and the RGB histogram 614B of the adjusted captured image more accurately captures the true colors of the scene.

Figure 7:
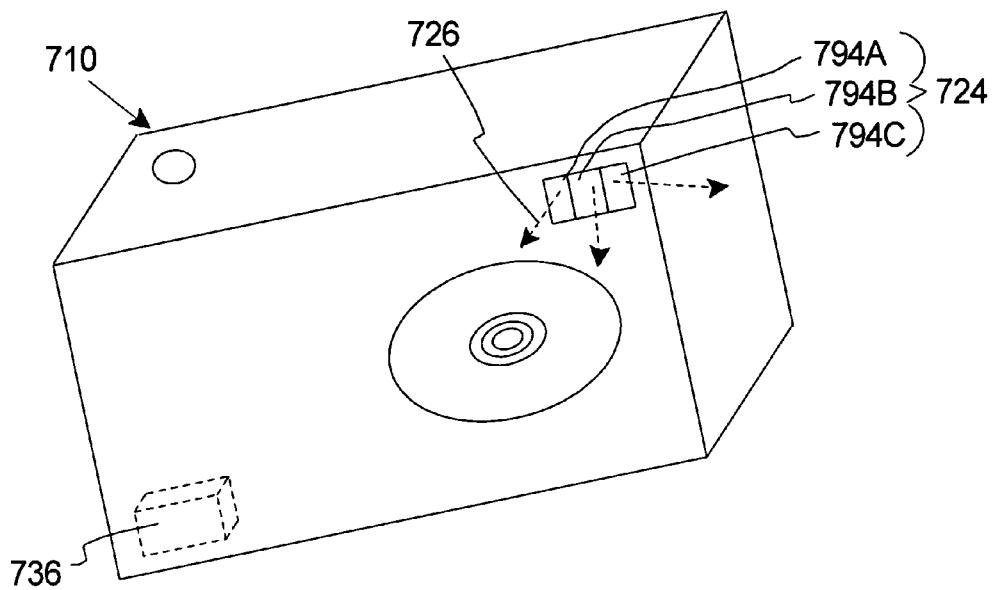
FIG. 7 is a simplified front perspective view of still another embodiment of the image capturing apparatus.

FIG. 7 illustrates a simplified, front perspective view of yet another embodiment of an image capturing apparatus 710 that is somewhat similar to the corresponding image capturing apparatus 210 described above and illustrated in FIG. 2A. However, in this embodiment, the illumination system 724 can be controlled to precisely adjust the color content of the generated light beam 726 to compensate for the absorption of the light by the fluid 16 (illustrated in FIG. 1A) and/or replace the colors that were lost by absorption. For example, the illumination system 724 can precisely adjust the color content of the generated light beam 726 according to one or more of the apparatus depth AD (illustrated in FIG. 1A), the separation distance SDist (illustrated in FIG. 1A), the subject depth Sdep (illustrated in FIG. 1A), and/or the type of fluid 16.

In one embodiment, the generated light beam 726 includes at least one of the primary colors, namely red, blue and green. For example, in alternative embodiments, the illumination system 724 can generate a generated light beam 726 that includes two or all three of the primary colors.

In one embodiment, the illumination system 724 includes a red light emitting diode ("LED" or "LED array") 794A, a blue LED 794B, and a green LED 794C that can be selectively and individually controlled and tuned to produce a generated light beam 726 that is red, blue, green, or potentially millions of other colors using different intensities for the LEDs 794A-794C. The LEDs 794A-794C can be placed side by side or the LEDs 794A-794C can be integrated together. Alternatively, the illumination system 724 can be another type of device that includes a red light source, a blue light source and a green light source and/or is capable of generating a light beam 726 that include red, blue and green colors.

In alternative, non-exclusive embodiments, the illumination system 724 can be controlled to selectively and alternatively produce 2, 5, 10, 20, 50, 100, 500, 1000, or 1,000,000 different generated light beams 726 with each generated light beam 726 having a different color composition.

In one embodiment, the intensity of the generated light beam 726 can be controlled to be proportional to the ambient lighting conditions of the scene.

In this embodiment, the control system 736 controls the operation of the illumination system 724 to precisely control the timing and color content of the generated light beam 726. As an example, the control system 736 can direct power to the LEDs 794A-794C at different levels so that the LEDs 794A-794C illuminate at the desired intensities and the desired color content of the generated light beam 726 is generated.

In one embodiment, the control system 736 controls the operation of the illumination system 724 so that the generated light beam 726 has the appropriate color composition to compensate for the wavelength which were attenuated from the scene 12 (illustrated in FIG. 1A). For example, the control system 736 can evaluate the pre-captured image, e.g. a through image (not shown) just prior to capturing the actual image, the apparatus depth AD, the separation distance SDist, the subject depth Sdep, and/or the type of fluid 16. With this information, the control system 736 can calculate the color composition of the generated light beam 726 necessary to compensate for the attenuated light and the control system 736 can control the illumination system 724 so that the appropriate generated light beam 726 is created.

It should be noted that the generated light beam 726 travels to the subject 20 (illustrated in FIG. 1A) and back to the image capturing apparatus 710. Stated in another fashion, the generated light beam 726 travels approximately two times the separation distance SDist. Thus, the control system 736 can also factor in the attenuation of the generated light beam 726 in the determination of the color composition of the generated light beam 726.

Figure 8A:
FIGS. 8A and 8B illustrate two separate scenes and two separate generated beams.
Figure 8A:
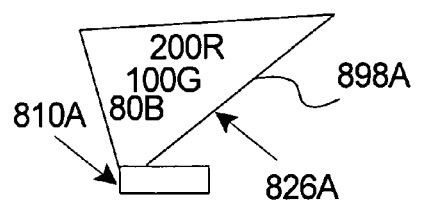
Figure 8B:
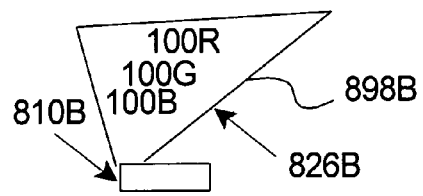

FIGS. 8A and 8B illustrate two separate, non-exclusive scene conditions 896A, 896B for two different scenes 812A, 812B and that the image capturing apparatus 810A, 810B generates a different generated light beam 826A, 826B for each scene condition 896A, 896B. More specifically, referring to FIG. 8A, the scene 812A has a first scene condition 896A and the image capturing apparatus 810A generates a first generated light beam 826A having a first color composition 898A. Further, referring to FIG. 8B, the scene 812B has a second scene condition 896B and the image capturing apparatus 810B generates a second generated light beam 826B having a second color composition 898B.

In this example, the control system 736 (illustrated in FIG. 7) causes the illumination system 724 (illustrated in FIG. 7) to generate the first generated light beam 826A when it is determined that the first scene condition 868A exists and to generate the second generated light beam 826B when it is determined that the second scene condition 868B exists. The control system 724 can evaluate the apparatus depth AD, separation distance SDist, subject depth SDep and/or fluid type to determine the scene condition 868A, 868B.

In one embodiment, the illumination system 724 generates the first generated light beam 826A when the apparatus depth signal corresponds to a first apparatus depth and the illumination system 724 generates the second generated light beam 826B when the apparatus depth signal corresponds to a second apparatus depth. Alternatively, the illumination system 724 generates the first generated light beam 826A when the separation distance has a first value and the illumination system 724 generates the second generated light beam 826B when the separation distance has a second value.

In this example, the first color composition 898A is different than the second color composition 898B. For example, (i) the first color composition 898A of the first generated light beam 826A that includes more red R than green G or blue B, and has color composition that is approximately 200R(red)+ 100G(green)+80B(blue), and (ii) the second color composition 898B of the second generated light beam 826B has approximately equal amounts a blue B, red R and green G and has a color composition that is approximately 100R(red)+ 100G(green)+100B(blue). It should be noted that the numbers for red, green and blue above are the tonal values on a scale of 0 to 255. Further, for example, a color composition 255R(red)+255G(green)+255B(blue) is pure white a color composition of 0R(red)+0G(green)+0B(blue) is pure black, and a color composition of 127R(red)+127G(green)+127B (blue) is middle grey.

Figure 9A:
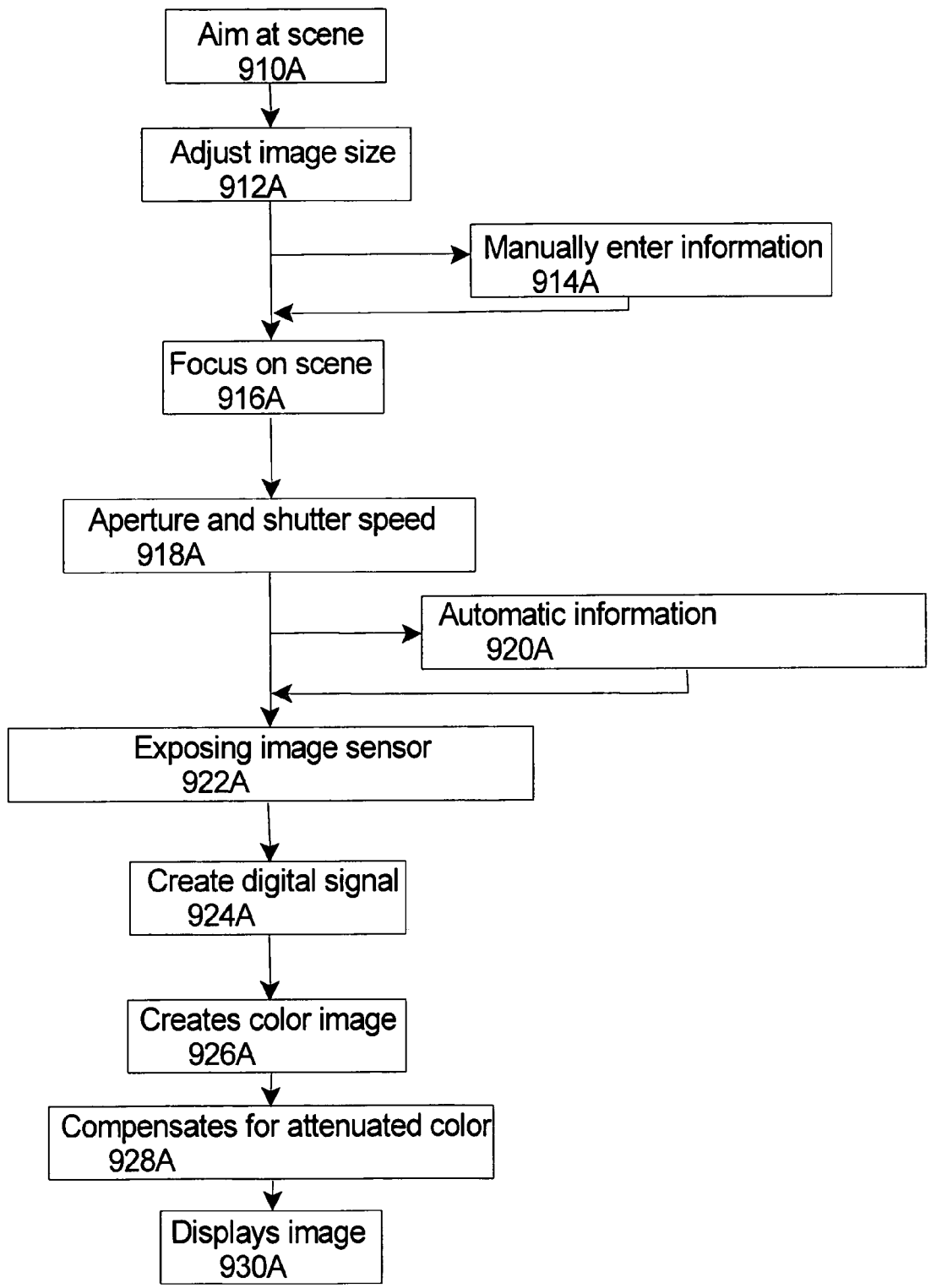
FIG. 9A is a simplified flowchart that illustrates one example of the operation of the image capturing apparatus.

FIG. 9A is a simplified flowchart that illustrates one non-exclusive example of the operation of the image capturing apparatus. It should be noted that one or more of the steps can be omitted or the order of steps can be switched. First, the image capturing apparatus is aimed toward the scene 910A. Second, the user adjusts the zoom so as to adjust the size of the image as desired 912A. Next, the user can manually enter information regarding apparatus depth AD, separation distance SDist, subject depth SDep, and/or fluid type into the apparatus 914A. Next, the user presses lightly on the shutter button to enable the image capturing apparatus to automatically focus on the object(s) 916A. Subsequently, the image capturing apparatus sets the aperture and shutter speed 918A. Simultaneously, the control system can receive information from one or more sensors relating to apparatus depth AD, separation distance SDist, and/or fluid type 920A. Subsequently, the user presses the shutter button all the way, which resets the image sensor, and opens the first shutter blade thereby exposing the image sensor to light, building up an electrical charge until the second shutter blade closes thereby preventing further light from reaching the image sensor 922A. Next, the ADC measures the charge at each photosite of the image sensor and creates a digital signal that represents the values of the charge at each photosite 924A. Subsequently, the control system interpolates the data from the different photosites, with assistance from the filtering component, to create the color image 926A. Next, the control system compensates for the attenuated light 928A. Finally, the image is displayed on the image display 930A.

Figure 9B:
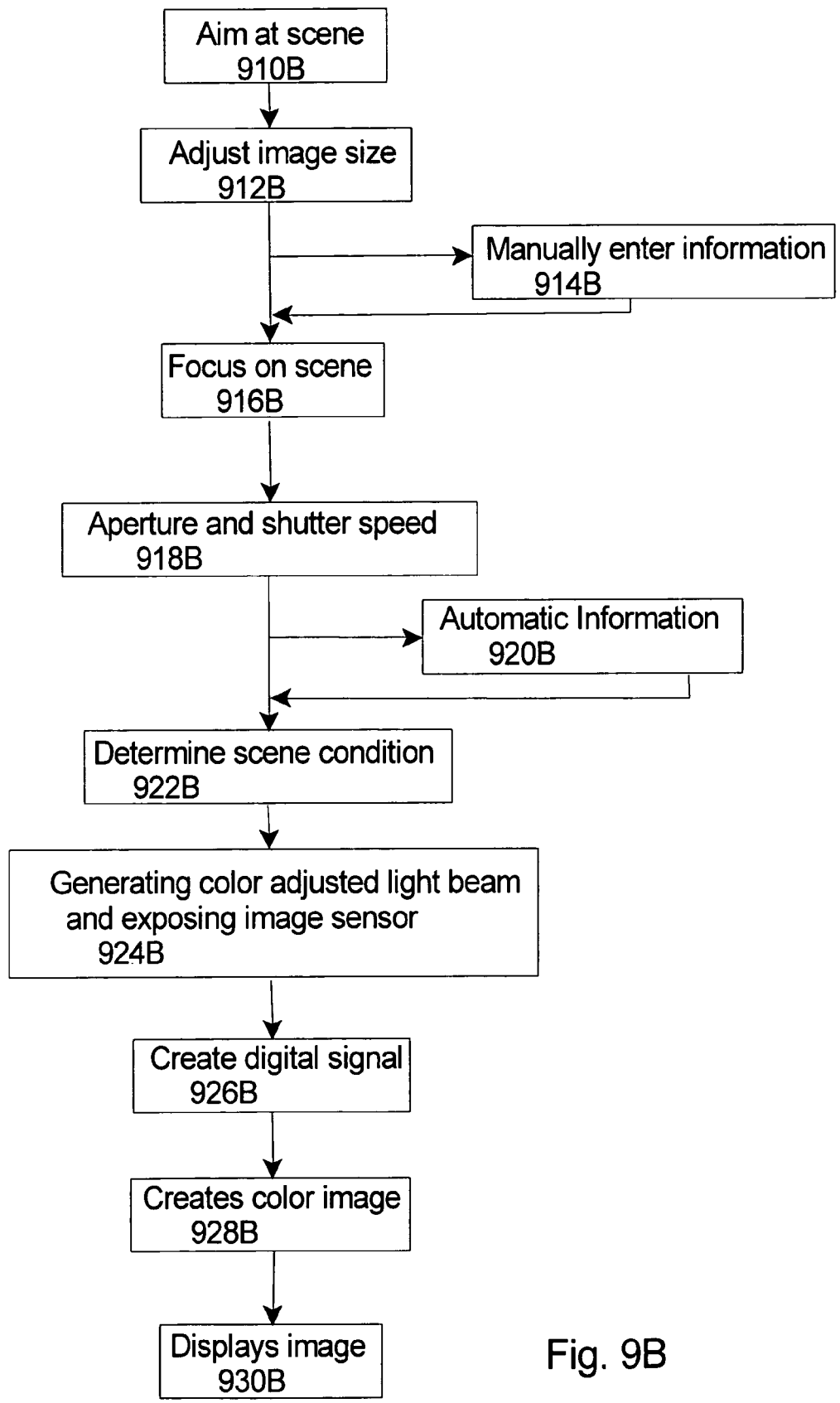
FIG. 9B is another simplified flowchart that illustrates another example of the operation of the image capturing apparatus.

FIG. 9B is a simplified flowchart that illustrates another non-exclusive example of the operation of the image capturing apparatus. It should be noted that one or more of the steps can be omitted or the order of the steps can be switched. First, the image capturing apparatus is aimed toward the scene 910B. Second, the user adjusts the zoom so as to adjust the size of the image as desired 912B. Next, the user can manually enter information regarding apparatus depth AD, separation distance SDist, subject depth SDep, and/or fluid type into the apparatus 914B. Next, the user presses lightly on the shutter button to enable the image capturing apparatus to automatically focus on the object(s) 916B. Subsequently, the image capturing apparatus sets the aperture and shutter speed 918B. Simultaneously, the control system can receive information from one or more sensors relating to apparatus depth AD, separation distance SDist, and/or fluid type 920B. Subsequently, the control system determines the scene condition of the scene and the composition of the generated light beam 922B. Next, the user presses the shutter button all the way, which resets the image sensor, causes the illumination system to generate the color adjusted light beam, and opens the first shutter shade thereby exposing the image sensor to light, building up an electrical charge until the second shutter shade closes thereby preventing further light from reaching the image sensor 924B. Next, the ADC measures the charge at each photosite of the image sensor and creates a digital signal that represents the values of the charge at each photosite 926B. Subsequently, the control system interpolates the data from the different photosites, with assistance from the filtering component, to create the color image 928B. Finally, the image is displayed on the image display 930B.

While the current invention is disclosed in detail herein, it is to be understood that it is merely illustrative of the presently preferred embodiments of the invention and that no limitations are intended to the details of construction or design herein shown other than as described in the appended claims.

What is claimed is:

1. An image capturing apparatus for capturing an image of a subject of a scene within a liquid having a liquid surface, the image capturing apparatus comprising:
   an apparatus frame;
   a capturing system for capturing the image, the capturing system being secured to the apparatus frame; and
   a control system that adjusts a color content of the captured image based on a liquid type of the liquid.

2. The image capturing apparatus of claim 1 wherein the control system further adjusts the color content of the captured image based on a separation distance between the image capturing apparatus and the subject.

3. The image capturing apparatus of claim 1 wherein the control system further adjusts the color content of the captured image based on an apparatus depth of the image capturing apparatus below the liquid surface.

4. The image capturing apparatus of claim 1 wherein the control system further adjusts the color content of the captured image based on a subject depth of the subject below the liquid surface.

5. The image capturing apparatus of claim 1 wherein the control system further adjusts the color content of the captured image based on a separation distance between the image capturing apparatus and the subject, an apparatus depth of the image capturing apparatus below the liquid surface, and a subject depth of the subject below the liquid surface.

6. The image capturing apparatus of claim 5 wherein the control system calculates an attenuation of light based on at least one of (i) the separation distance, (ii) the apparatus depth, (iii) the subject depth, or (iv) the liquid type.

7. The image capturing apparatus of claim 1 wherein the control system calculates an attenuation of light based on the liquid type.

8. The image capturing apparatus of claim 1 further comprising an illumination system that generates a first generated light beam having a first color composition and a second generated light beam having a second color composition that is different than the first color composition, wherein each of the generated light beams includes at least one of the primary colors.

9. The image capturing apparatus of claim 1 further comprising a selector that can be selectively controlled by a user to manually select the liquid type.

10. The image capturing apparatus of claim 1 wherein the liquid type could be a first liquid type or a second liquid type, and wherein the control system makes a first color content adjustment if the liquid type is the first liquid type and makes a second color content adjustment if the liquid type is the second liquid type, the second color content adjustment being different than the first color content adjustment.

11. The image capturing apparatus of claim 1 wherein the liquid type could be fresh water or salt water, and wherein the color content adjustment made by the control system is different depending on whether the liquid type is fresh water or salt water.

12. The image capturing apparatus of claim 1 wherein the liquid type could be pure ocean water, turbid tropical-subtropical water, mid-latitude water or coastal waters of increasing turbidity, and wherein the color content adjustment made by the control system is different for each of the different liquid types.

13. An image capturing apparatus for capturing an image of a subject of a scene within a fluid having a fluid surface, the image capturing apparatus comprising:
an apparatus frame;
a capturing system for capturing the image, the capturing system being secured to the apparatus frame;
an illumination system that generates a generated light beam; and
a control system that controls the illumination system to adjust a color composition of the generated light beam based on at least one of (i) a separation distance between the image capturing apparatus and the subject, (ii) an apparatus depth of the image capturing apparatus below the fluid surface, (iii) a subject depth of the subject below the fluid surface, or (iv) a fluid type of the fluid.

14. The image capturing apparatus of claim 13 wherein the generated light beam includes at least one of the primary colors.

15. The image capturing apparatus of claim 13 wherein the generated light beam includes the three primary colors.

16. The image capturing apparatus of claim 13 wherein the control system adjusts the color composition of the generated light beam based on the separation distance and the apparatus depth.

17. The image capturing apparatus of claim 13 wherein the control system adjusts the color composition of the generated light beam based on the separation distance, the apparatus depth, and the fluid type.

18. The image capturing apparatus of claim 13 further comprising a selector that can be selectively controlled by a user to select at least one of (i) the separation distance, (ii) the apparatus depth, (iii) the subject depth, or (iv) the fluid type.

19. The image capturing apparatus of claim 13 wherein the scene has one of a first scene condition and a second scene condition that is different than the first scene condition, and wherein the illumination system generates a first generated light beam having a first color composition when the scene has the first scene condition and the illumination system generates a second generated light beam having a second color composition when the scene has the second scene condition, and wherein the second color composition is different than the first color composition.

20. An image capturing apparatus for capturing an image of a subject in a scene within a fluid having a fluid surface, the image capturing apparatus comprising:
an apparatus frame;
a capturing system for capturing the image, the capturing system being secured to the apparatus frame;
a depth sensor coupled to the apparatus frame, the depth sensor providing an apparatus depth signal that corresponds to an apparatus depth of the image capturing apparatus below the fluid surface; and
an illumination system that generates a first generated light beam having a first color composition and a second generated light beam having a second color composition that is different than the first color composition, wherein the illumination system generates the first generated light beam when the apparatus depth signal corresponds to a first apparatus depth and the illumination system generates the second generated light beam when the apparatus depth signal corresponds to a second apparatus depth.

21. The image capturing apparatus of claim 20 further comprising a control system that utilizes the apparatus depth signal to adjust a color composition of the image that is captured by the capturing system.

22. The image capturing apparatus of claim 21 wherein the control system calculates an attenuation of light based on the apparatus depth signal and the control system adjusts the color composition of the image that is captured by the capturing system based on the attenuation of light.

23. The image capturing apparatus of claim 20 further comprising a depth warning indicator that indicates when the image capturing apparatus is approximately at a predetermined depth under the fluid surface, the depth warning indicator being electrically connected to the depth sensor.

24. A method for capturing an image of a scene within a liquid, the method comprising the steps of:
providing an apparatus frame;
capturing the image with a capturing system, the capturing system being secured to the apparatus frame; and
adjusting a color content of the captured image with a control system based on a liquid type of the liquid.

25. The method of claim 24 further comprising the step of calculating an attenuation of light with the control system based on the liquid type.

26. The method of claim 24 further comprising the step of alternatively generating a first generated light beam having a first color composition and a second generated light beam having a second color composition that is different than the first color composition with an illumination system, wherein each of the generated light beams includes at least one of the primary colors.

27. The method of claim 24 further comprising the step of manually entering the liquid type with a selector into the control system.

28. The method of claim 24 wherein the liquid type could be a first liquid type or a second liquid type, and wherein the step of adjusting includes the control system making a first color content adjustment if the liquid type is the first liquid type and making a second color content adjustment if the liquid type is the second liquid type, the second color content adjustment being different than the first color content adjustment.

29. The method of claim 24 wherein the liquid type could be fresh water or salt water, and wherein the step of adjusting includes the control system making a different color content adjustment depending on whether the liquid type is fresh water or salt water.

30. The method of claim 24 wherein the liquid type could be pure ocean water, turbid tropical-subtropical water, mid-latitude water or coastal waters of increasing turbidity, and wherein the step of adjusting includes the control system making a different color content adjustment for each of the different liquid types.

31. A method for capturing an image of a scene within a fluid, the method comprising the steps of:
providing an apparatus frame;
capturing the image with a capturing system, the capturing system being secured to the apparatus frame;
generating a generated light beam with an illumination system; and
controlling the illumination system to adjust a color composition of the generated beam with a control system based on at least one of (i) a separation distance between the image capturing apparatus and a subject of the scene, (ii) an apparatus depth of the image capturing apparatus below a fluid surface of the fluid, (iii) a subject depth of the subject below the fluid surface, or (iv) a fluid type of the fluid.

32. The method of claim 31 wherein the generated light beam includes the three primary colors.

33. The method of claim 31 further comprising the step of calculating an attenuation of light with the control system based on at least one of (i) the separation distance, (ii) the apparatus depth, (iii) the subject depth, or (iv) the fluid type.

34. The method of claim 31 wherein the step of generating includes the step of alternatively generating a first generated light beam having a first color composition and a second generated light beam having a second color composition that is different than the first color composition with an illumination system, wherein each of the generated light beams includes at least one of the primary colors.

35. An image capturing apparatus for capturing an image of a subject of a scene within a fluid having a fluid surface, the image capturing apparatus comprising:

an apparatus frame;

a capturing system for capturing the image, the capturing system being secured to the apparatus frame;

a selector that can be selectively controlled by a user to manually select a fluid type of the fluid; and a control system that adjusts a color content of the captured image based on the fluid type of the fluid.

36. A method for capturing an image of a scene within a fluid, the method comprising the steps of:

providing an apparatus frame;

capturing the image with a capturing system, the capturing system being secured to the apparatus frame;

manually entering a fluid type of the fluid with a selector into a control system; and adjusting a color content of the captured image with the control system based on the fluid type of the fluid.

* * * * *